(No Model.)

J. MUSGROVE.
COVER HOLDER FOR TEA KETTLES, &c.

No. 478,967. Patented July 12, 1892.

Witnesses:
Ebc Amur
Chas. L. Goss.

Inventor:
Joseph Musgrove
By Whittlesey Howler Smith Patten
Attorneys.

THE NORRIS PETERS CO., PHOTO-LITHO., WASHINGTON, D. C.

UNITED STATES PATENT OFFICE.

JOSEPH MUSGROVE, OF MILWAUKEE, WISCONSIN, ASSIGNOR TO THE GENDER & PAESCHKE MANUFACTURING COMPANY, OF SAME PLACE.

COVER-HOLDER FOR TEA-KETTLES, &c.

SPECIFICATION forming part of Letters Patent No. 478,967, dated July 12, 1892.

Application filed April 11, 1892. Serial No. 428,720. (No model.)

*To all whom it may concern:*

Be it known that I, JOSEPH MUSGROVE, of Milwaukee, in the county of Milwaukee and State of Wisconsin, have invented certain new and useful Improvements in Cover-Holders for Tea-Kettles, &c.; and I do hereby declare that the following is a full, clear, and exact description thereof, which will enable others skilled in the art to which it pertains to make and use the same, reference being had to the accompanying drawings, and to the letters of reference marked thereon, which form a part of this specification.

The object of my invention is to hold the cover of kettles or similar utensils in place when the kettle is tilted and to provide a fastening for that purpose which will operate independently of the bail or handle.

It consists, essentially, of an elastic or semi-elastic bearing-piece attached to the top of the kettle, pail, or other utensil inside thereof and projecting a little inside of the cover-opening, so as to bear with a yielding pressure against the rim or portion of the cover inserted in said opening.

In the accompanying drawings like letters designate the same parts in both figures.

Figure 1:
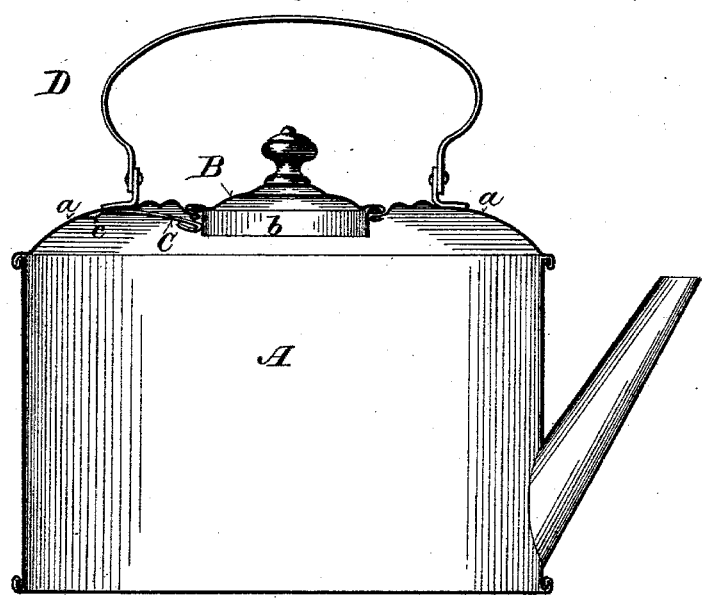
Figure 2:
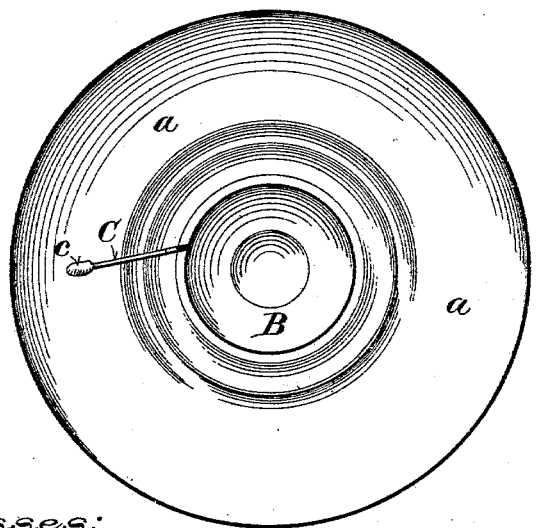

Figure 1 is a vertical medial section of a tea-kettle of a common form provided with my cover-holder. Fig. 2 is an inverted view of the top of the kettle and cover.

A represents the body of the kettle; $a$, the top having the usual contracted opening at the center for the cover.

B is the cover, formed or provided a little inside of its edge with a rim $b$, which is approximately fitted to the opening in the top $a$.

As usually constructed, the covers of this class of kettles or utensils do not snugly fit into the openings formed for their reception, and even if they do so fit when first made they become loose with constant usage, so that when the kettle or other similar utensil is tilted for pouring the contents therefrom or otherwise the cover is very apt to fall out of place, thus causing great vexation and annoyance. To avoid such annoyance and the necessity of holding the cover on by hand, I provide a spring or elastic holder C, which is attached at $c$ by solder or other suitable means to the inside of the top $a$ of the kettle some distance outside of the cover-opening, with one end projecting normally a little inside of the cover-opening, so as to bear with a yielding pressure against the rim $b$ of the cover when it is inserted in said opening, as shown in the drawings. I prefer to make this spring or holder, which may be conveniently constructed of wire, semi-elastic or flexible, so that it may be bent with the fingers to project more or less into the cover-opening and to bear with greater or less pressure, as desired, against the rim of the cover.

D is the bail or handle of the kettle, which, it will be observed, is entirely independent of the cover and the holder and may be manipulated in the usual manner without effect thereon.

It is obvious that the holder may be made of a strip of sheet metal as well as of wire.

I claim—

1. The combination, with a kettle, pail, or other utensil provided with a removable cover, of a yielding holder attached to the top of the kettle inside and projecting slightly into the cover-opening, substantially as and for the purposes set forth.

2. The combination, with a kettle, pail, or other utensil having a contracted opening in the top and a removable cover for closing said opening provided with a rim adapted to be inserted therein, of a yielding holder secured to the inside of the top at a distance from the cover-opening and projecting slightly into said opening, so as to bear with a yielding pressure against the rim of the cover when it is inserted in said opening, and thereby hold the cover in place, substantially as and for the purposes set forth.

3. The combination, with a kettle, pail, or other utensil having a contracted opening in the top and a removable cover for said opening, provided with a rim adapted to be inserted therein, a semi-elastic holder attached to the inside of the kettle or the like a short distance from said opening and projecting slightly into the same, so as to bear against the rim of the cover and hold the same in place, said holder being capable of being bent so as to project more or less into said opening, substantially as and for the purposes set forth.

In testimony that I claim the foregoing as my own I affix my signature in presence of two witnesses.

JOSEPH MUSGROVE.

Witnesses:
CHAS. L. GOSS,
WILLIAM GENDER.

It is hereby certified that the name of the assignee in Letters Patent No. 478,967, granted July 12, 1892, upon the application of Joseph Musgrove, of Milwaukee, Wisconsin, for an improvement in "Cover-Holders for Tea Kettles, etc.," was erroneously written and printed "Gender & Paeschke Manufacturing Company," whereas said name should have been written and printed *Geuder & Paeschke Manufacturing Company;* and that the said Letters Patent should be read with this correction therein that the same may conform to the files and records of the case in the Patent Office.

Signed, countersigned, and sealed this 2d day of August, A. D. 1892.

[SEAL.]

CYRUS BUSSEY,
*Assistant Secretary of the Interior.*

Countersigned:
N. L. FROTHINGHAM,
*Acting Commissioner of Patents.*